United States Patent
Yoshino et al.

(10) Patent No.: US 11,806,816 B2
(45) Date of Patent: Nov. 7, 2023

(54) ALUMINUM BRAZING SHEET FOR FLUXLESS BRAZING USE

(71) Applicant: MA Aluminum Corporation, Minato-ku (JP)

(72) Inventors: Michihide Yoshino, Susono (JP); Hideyuki Miyake, Susono (JP); Hajime Chiba, Naka (JP)

(73) Assignee: MA Aluminum Corporation, Minato-ku (JP)

( * ) Notice: Subject to any disclaimer, the term of this patent is extended or adjusted under 35 U.S.C. 154(b) by 0 days.

(21) Appl. No.: 17/907,731

(22) PCT Filed: Feb. 15, 2021

(86) PCT No.: PCT/JP2021/005499
§ 371 (c)(1),
(2) Date: Sep. 29, 2022

(87) PCT Pub. No.: WO2021/199732
PCT Pub. Date: Oct. 7, 2021

(65) Prior Publication Data
US 2023/0125002 A1     Apr. 20, 2023

(30) Foreign Application Priority Data

Mar. 31, 2020   (JP) .................................. 2020-065307

(51) Int. Cl.
*B23K 35/02*     (2006.01)
*B23K 1/00*      (2006.01)
(Continued)

(52) U.S. Cl.
CPC ........ *B23K 35/0238* (2013.01); *B23K 1/0012* (2013.01); *B23K 35/288* (2013.01);
(Continued)

(58) Field of Classification Search
None
See application file for complete search history.

(56) References Cited

U.S. PATENT DOCUMENTS 8,455,110 B2 *  6/2013  Wittebrood ........ B23K 35/0238
                                                   428/654
2016/0319399 A1 * 11/2016  Ando ........................ C22F 1/04

FOREIGN PATENT DOCUMENTS

CN       1145346 A    3/1997
CN     105339514 A    2/2016
(Continued)

OTHER PUBLICATIONS

Anderson, Kevin Weritz, John Kaufman, J. Gilbert. (2018). ASM Handbook, vol. 02A—Aluminum Science and Technology—1. Aluminum Alloy Nomenclature and Temper Designations. ASM International. (Year: 2018).*

(Continued)

*Primary Examiner* — Daniel J. Schleis
(74) *Attorney, Agent, or Firm* — Oblon, McClelland, Maier & Neustadt, L.L.P.

(57) ABSTRACT

An aluminum brazing sheet for flux-free brazing having a multilayer structure of two or more layers including at least one core material layer and one brazing material layer, wherein the brazing material layer is positioned on one or both sides of the core material layer and on an outermost surface of the brazing sheet. The brazing material layer is made of an Al—Si—Mg—X brazing material containing: in mass%, 0.05 to 2.0% of Mg, and 2.0 to 14.0% of Si, and further containing one or more of 0.01 to 0.3% of Bi, Ga, Sn, In and Pb, a total amount of Bi, Ga, Sn, In and Pb being 0.5% or less. X indicates one or more of Bi, Ga, Sn, In and Pb.

7 Claims, 2 Drawing Sheets

(51) Int. Cl.
   *B23K 35/28* (2006.01)
   *C22C 21/10* (2006.01)
   *B23K 103/10* (2006.01)
   *B23K 103/16* (2006.01)
   *B23K 101/14* (2006.01)

(52) U.S. Cl.
   CPC .......... *C22C 21/10* (2013.01); *B23K 2101/14* (2018.08); *B23K 2103/10* (2018.08); *B23K 2103/166* (2018.08)

(56) References Cited

FOREIGN PATENT DOCUMENTS

| | | |
|---|---|---|
| CN | 110719965 A | 1/2020 |
| JP | 51-96749 A | 8/1976 |
| JP | 56-144895 A | 11/1981 |
| JP | 5-228684 A | 9/1993 |
| JP | 6-182582 A | 7/1994 |
| JP | 2001-303161 A | 10/2001 |
| JP | 4547032 B1 | 9/2010 |
| JP | 2013-220461 A | 10/2013 |
| JP | 2014-50861 A | 3/2014 |
| JP | 2019-13981 A | 1/2019 |
| KR | 10-0615685 B1 | 8/2006 |

OTHER PUBLICATIONS

International Search Report and Written Opinion dated Apr. 27, 2021 in PCT/JP2021/005499, filed on Feb. 15, 2021, 11 pages (With English Translation).

Combined Chinese Office Action and Search Report dated Feb. 16, 2023 in Patent Application No. 202180025881.0 (with English language translation), 14 pages.

* cited by examiner

LOCATIONS FOR EVALUATING WIDTH OF JOINT PART

ALUMINUM BRAZING SHEET FOR FLUXLESS BRAZING USE

CROSS REFERENCE TO RELATED APPLICATIONS

This application is a National Stage entry under 35 U.S.C. § 371 of PCT/JP2021/005499, filed on Feb. 15, 2021, and claims priority to Japanese Patent Application No. 2020-065307, filed on Mar. 31, 2020. The entire contents of both are incorporated herein by reference.

TECHNICAL FIELD

The present invention relates to an aluminum brazing sheet suitable for flux-free brazing or the like.

Priority is claimed on Japanese Patent Application No. 2020-065307, filed Mar. 31, 2020, the content of which is incorporated herein by reference.

BACKGROUND ART

For aluminum car heat exchangers such as capacitors or evaporators, attempts not only for size reduction and weight reduction but also for the thickness reduction and strengthening of aluminum materials have been thus far made. In the manufacture of aluminum heat exchangers, brazing is performed to join joints; however, in brazing methods where fluoride fluxes, which are the current mainstream fluxes, are used, since the fluxes react with Mg in materials to be inactivated and poor brazing is likely to occur, the use of such brazing methods for Mg-added high-strength members is limited. Therefore, a brazing method by which Mg-added aluminum alloys are joined without using fluxes is desired.

In flux-free brazing where an Al—Si—Mg brazing material is used. Mg in the brazing material that has been melted and activated reduces and decomposes an Al oxide film on the surface of a joining portion, which enables joining. In closed face joining joints or the like, a favorable joining state can be obtained in joints where brazing sheets each having a brazing material are combined by the oxide film decomposition action of Mg or joints where a brazing sheet and a member to be joined having no brazing materials (pair material) are combined (refer to Patent Literature 1).

CITATION LIST

Patent Literature

[Patent Literature 1]
  Japanese Patent No. 4547032
[Patent Literature 2]
  Japanese Unexamined Patent Application, First Publication No. 2014-50861

SUMMARY OF INVENTION

Technical Problem

However, in tube and fin joining portions, which are a typical joint shape in ordinary heat exchangers such as capacitors or evaporators, the joining portions are likely to be affected by the atmosphere during brazing, and a MgO film is likely to grow on the surface of a Mg-added brazing material. Since MgO films are stable oxide films that are not easily decomposed, when a MgO film occurs, joining is significantly impaired.

Therefore, in order to apply flux-free techniques to ordinary heat exchangers, brazing sheets for flux-free brazing with which a stable joining state can be obtained in joints having an opening portion am strongly desired.

As a method for stabilizing the joining state of flux-free brazing, the present inventors are studying a technique where, for example, an Al—Si—Mg—Bi brazing material, which is described in Patent Literature 2 and the like, is used and the distribution slate of Bi particles or Mg—Bi compound particles in this material is controlled. According to this technique, when a Bi element having an equivalent circle diameter of 5.0 to 50 μm or a Bi—Mg compound is dispersed in a brazing material, this compound is exposed on the surface of the brazing material during the manufacture of a material, and the formation of an oxide film in a compound-exposed portion is suppressed, which makes it possible to expect that the flux-free brazability can be improved within a short period of a brazing heating time.

However, it is difficult to say that the joining property that can be obtained is stable enough to replace brazing methods where fluoride fluxes, which are the current mainstream, are used, and additional technical improvement is requited to broadly apply this technique to ordinary heat exchangers.

Therefore, the present inventors closely inspected the behaviors of Bi and brazability in the brazing process of an Al—Si—Mg brazing material to which Bi is added in consideration of the above-described problem.

As a result, the present inventors found, in addition to conventional findings, that, even in the Al—Si—Mg brazing material to which Bi is added, in a case where a large amount of MgO is generated, the brazability deteriorates, that is, in a case where the proportion of MgO in an oxide film is small, the brazability improves.

Furthermore, as a result of studies, the present inventors found that, in the case of the Al—Si—Mg brazing material to which Bi is added, the fact that molten metal Bi generated in the temperature rise process for brazing concentrates in the oxide film (MgO) and MgO becomes brittle is a cause of brazability improvement.

Furthermore, as a result of studies, the present inventors found that the easiness in concentration of the molten metal Bi in MgO varies with the quality of the MgO film, and. in a case where MgO is crystalline, it is difficult for the generated molten metal Bi to penetrate into the oxide film: however, on the other hand, in a case where MgO is non crystalline, it is easy for the molten metal Bi to penetrate into the film, and MgO is likely to become more brittle.

That is, the present inventors found that, in order to improve the brazability of the Al—Si—Mg brazing material to which Bi is added, it is important to control the quality of the MgO film.

In the above-described technique where Bi is concentrated, in a case where it is not possible to control the quality of the MgO film, there is a need to generate a larger amount of molten metal Bi in order to cause Bi to penetrate into MgO. Therefore, in the above-described technique where Bi is concentrated, it is assumed that there is a need to control the dispersion state of a Mg—Bi compound before brazing.

Furthermore, from the present inventors' studies, it was found that, as a result of searching for an element that concentrates in MgO and makes MgO brittle, Ga, Sn. In and Pb also have the same effect as Bi.

The present invention has been made in consideration of the above-described background, and an objective of the present invention is to provide an aluminum brazing sheet for flux-free brazing from which a favorable joining property can be obtained in flux-free brazing.

Solution to Problem (1) An aluminum brazing sheet for flux-free brazing according to the present aspect is an aluminum brazing sheet having a multilayer structure of two or more layers including at least one core material layer and one brazing material layer, wherein the brazing material layer is positioned on one or both sides of the core material layer and on an outermost surface of the brazing sheet, the brazing material layer is made of an Al—Si—Mg—X brazing material containing: in mass %, 0.05 to 2.0% of Mg, and 2.0 to 14.0% of Si, and further containing one or more of 0.01 to 0.3% of Bi, Ga, Sn, In and Pb, a total amount of Bi, Ga, Sn, In and Pb being 0.5% or less, an area ratio of MgO in an oxide film on a surface of the Al—Si—Mg—X brazing material is 2% or less, and an area ratio of a region with crystallinity among the MgO in the oxide film is 4% or less. Here, the X indicates one or more of Bi, Ga, Sn, In and Pb.

(2) In the aluminum brazing sheet for flux-free brazing according to the present aspect, it is preferable that the brazing material contains, in mass %, 0.1 to 1.5% of Mg and 3.0 to 12.5% of Si, and further contains one or more of Bi, Ga, Sn, In and Pb in a total amount of 0.03 to 0.25%.

(3) In the aluminum brazing sheet for flux-free brazing according to the present aspect, it is preferable that the core material contains one or more of: in mass %, Si: 0.05 to 1.2%, Mg: 0.01 to 2.0%, Mn: 0.1 to 2.5%, Cu: 0.01 to 2.5%, Fe: 0.05 to 1.5%, Zr: 0.01 to 0.3%, Ti: 0.01 to 0.3%, Cr: 0.01 to 0.5%, Bi: 0.005 to 1.5%, and Zn: 0.1 to 9.0%.

(4) In the aluminum brazing sheet for flux-free brazing according to the present aspect, it is preferable that the core material contains: in mass %, Si: 0.05 to 1.2%, and Mg: 0.01 to 2.0%, and further contains one or more of: Mn: 0.1 to 2.5%, Cu: 0.01 to 2.5%, Fe: 0.05 to 1.5%, Zr: 0.01 to 0.3%, Ti: 0.01 to 0.3%, Cr: 0.01 to 0.5%, Bi: 0.005 to 1.5%, and Zn: 0.1 to 9.0%.

(5) In the aluminum brazing sheet for flux-free brazing according to the present aspect, it is preferable that the core material is clad with a sacrificial material, and the sacrificial material contains, in mass %, Zn: 0.1 to 9.0%, and further contains one or more of Si: 0.05 to 1.2%, Mg: 0.01 to 2.0%, Mn: 0.1 to 2.5%, Fe: 0.05 to 1.5%, Zr: 0.01 to 0.3%, Ti: 0.01 to 0.3%, Cr: 0.01 to 0.5%, and Bi: 0.005 to 1.5%.

Advantageous Effects of Invention

According to the present aspect, it becomes possible to perform favorable and stable joining by flux-free brazing.

DESCRIPTION OF EMBODIMENTS

Hereinafter, the present invention will be described in detail based on embodiments.

A brazing sheet for flux-free brazing of a first embodiment is an aluminum brazing sheet having a multilayer structure of at least two layers or more and contains a core material and an Al—Si brazing material that clads one or both sides of the core material and is positioned on an outermost surface.

The brazing sheet of the present embodiment may be a brazing sheet having a three-layer structure in which one side of the core material is clad with a brazing material and the other side of the core material is clad with a sacrificial material.

In addition, the brazing sheet may be a four-layer structure of a brazing material, a core material, a sacrificial material and a brazing material or may be a five-layer structure of a brazing material, a sacrificial material, a core material, a sacrificial material and a brazing material, and the clad configuration is not particularly limited.

The Al—Si brazing material has a composition containing: in mass %, 0.05 to 2.0% of Mg, and 2.0 to 14.0% of Si, and further containing one or more of 0.01 to 0.3% of Bi, Ga, Sn, In and Pb, the total amount of Bi, Ga, Sn, In and Pb being 0.5% or less with a balance of Al.

In addition, the proportion of MgO in an oxide film that is generated on a surface of the Al—Si—Mg—X brazing material is 2% or less, and the proportion of a region with crystallinity among the MgO in the oxide film is 4% or less. Here, the X indicates one or more of Bi, Ga, Sn, In and Pb.

Hereinafter, the composition and the like that are specified in the brazing sheet of the present embodiment will be described. Contents are expressed as mass ratios at all times, and, in a case where a range of the mass ratio is expressed using "to", unless particularly otherwise described, the expression means that the lower limit and the upper limit are included. Therefore, for example, 0.05 to 2.0% means 0.05 mass % or more and 2.0 mass % or less.

"Brazing Material"

"Mg: 0.05 to 2.0%"

Mg is added to reduce and decompose Al oxide films ($Al_2O_3$). When the Mg content is less than the lower limit, the effect is not sufficient, and, when the Mg content exceeds the upper limit, Mg reacts with oxygen in brazing atmospheres to generate MgO, which impairs joining (the proportion of MgO in oxide films increases). In a case where the Mg content is small, crystalline MgO is likely to be generated. Therefore, the Mg content is decided in the above-described range.

For the same reason, the Mg content is desirably set to be in a range of 0.1 to 1.5%. The Mg content is more desirably in a range of 0.2 to 1.5%.

"Bi, Ga, Sn, In and Pb: 0.005 to 0.3%; Total Amount of 0.5% or Less"

One or more of Bi, Ga, Sn, In and Pb are referred to as X.

X penetrates and concentrates in MgO films in the temperature rise process for brazing and makes MgO brittle, thereby improving brazability. When the X content is less than the lower limit, the effect is not sufficient, and, when the X content exceeds the upper limit, not only is the effect saturated, but the proportion of MgO in oxide films also increases. In addition, when the total amount of X exceeds 0.5%, an oxide of X is likely to be formed on the surface of the material, and the brazing joining property is impaired. Therefore, the content of each element that is X and the total amount are desirably decided in the above-described range. For the same reason, the X content is more desirably set to be in a range of 0.03 to 0.25%.

Si: 2.0 to 14.0%

Si is added to form molten brazing filler metal during brazing and form fillets of joining portions. When the Si content is less than the lower limit, the amount of molten brazing filler metal is insufficient. On the other hand, when the Si content is more than the upper limit, coarse Si is formed, and it becomes difficult to manufacture the material. Alternatively, a large number of coarse Si particles are precipitated. Therefore, the Si content is desirably decided in the above-described range. For the same reason, the Si content is more desirably set to be in a range of 3.0 to 12.5%.

Casting-induced coarse Si particles are massive or planar and, in some cases, remain as they are in the brazing sheet even after hot rolling without being pulverized. These coarse Si particles cause local melting called erosion during brazing and cause the brazing sheet to be pierced.

The brazing material may contain 0.3% or less, for example, approximately 0.01 to 0.2%, of impurity elements such as Fe, Mn and Cu in addition to Mg and Si or the above-described elements. Alternatively, even when the brazing material contains the above-described impurity elements, the intended action of the present embodiment is not affected. In addition, the above-described impurity elements are permitted without hindering the effect of the present invention and thus may be actively added.

"Proportion of MgO in Oxide Film Surface: Area Ratio of 2% or Less"

In brazing, before the melting of brazing filler metal, oxide films are decomposed to expose newly generated aluminum surfaces, whereby joining is performed. MgO is an oxide film that is denser and stronger than $Al_2O_3$ and the like and is not easy to decompose during brazing, and thus, when the amount of MgO generated is large, brazability deteriorates. Therefore, there is a need to control MgO to be generated to a predetermined extent or less.

Generation of MgO during the temperature rise for brazing varies with the brazing atmosphere ($O_2$ concentration) or brazing conditions and is also affected by the state before brazing. That is, in a case where the proportion of MgO in oxide films before brazing is high, since MgO is generated in a manner that naturally occurring MgO grows, the amount of MgO generated increases even under the same brazing conditions. Therefore, it is important to reduce the proportion of MgO in oxide films before brazing in order to suppress the generation of MgO during brazing.

The proportion of MgO in oxide film surfaces before brazing can be controlled with the manufacturing conditions of the brazing material and a clad material.

"Region with Crystallinity Among MgO: Area Ratio of 4% or Less"

Bi, Ga, Sn, In and Pb penetrate into MgO films and make MgO brittle, thereby improving brazability. but the degree of penetration varies with the qualities of MgO films. In portions with crystallinity, the penetration is unlikely, and in portion without crystallinity, easy penetration is possible. Therefore, brazability improves when regions with crystallinity are small and regions without crystallinity are large among MgO. Therefore, there is a need to control the area ratio of regions with crystallinity among MgO to a predetermined amount or less.

The qualities of MgO films vary with the brazing atmosphere ($O_2$ concentration) or brazing conditions and is affected by the state before brazing. That is, in a case where MgO in oxide films before brazing is crystalline, since naturally occurring crystalline MgO grows, the proportion of crystalline MgO increases even under the same brazing conditions. Therefore, it is important to reduce regions with crystallinity among MgO before brazing in order to reduce regions with crystallinity among MgO.

The magnitude of the area ratio of regions with crystallinity among MgO before brazing can be controlled with material manufacturing conditions.

"Core Material"

The composition of the core material in the present aspect is not limited to a specific composition, and the following components are suitably shown.

The core material can be composed of. as an example, an aluminum alloy containing one or more of: in mass %, Si: 0.05 to 1.2%, Mg: 0.01 to 2.0%, Mn: 0.1 to 2.5%, Cu: 0.01 to 2.5%, Fe: 0.05 to 1.5%, Zr: 0.01 to 0.3%, Ti: 0.01 to 0.3%. Cr: 0.01 to 0.5%, Bi: 0.005 to 1.5%, and Zn: 0.1 to 9.0% with a balance consisting of Al and an inevitable impurity.

In addition, the core material can be composed of, as another example, an aluminum alloy containing, in mass %, Si: 0.05 to $_{1.2}$% and Mg: 0.01 to 2.0% and further containing one or more of Mn: 0.1 to 2.5%, Cu: 0.01 to 2.5%, Fe: 0.05 to 1.5%, Zr: 0.01 to 0.3%, Ti: 0.01 to 0.3%. Cr: 0.01 to 0.5%, Bi: 0.005 to 1.5%, and Zn: 0.1 to 9.0%; with a balance consisting of Al and an inevitable impurity.

Si: 0.05 to 1.2%

Si has an effect of not only improving the material strength by forming a solid solution but also being precipitated as $Mg_2Si$ or an Al—Mn—Si compound and improving the material strength. However, when the content is too small, the effect becomes insufficient. On the other hand, when the content is excessive, the solidus temperature of the core material decreases, and the core material melts during brazing. Therefore, in a case where Si is incorporated into the core material, the Si content is set to be in the above-described range. For the same reason, it is desirable to set the lower limit and upper limit of the Si content to 0.1% and 1.0%, respectively. Even in a case where Si is not actively incorporated, for example, 0.05% or less of Si may be contained in the core material as an inevitable impurity.

Mg: 0.01 to 2.0%

Mg improves the material strength by the precipitation of a compound with Si or the like. Some of Mg diffuses into the brazing material and reduces and decomposes oxide films ($Al_2O_3$). However, when the content is too small, the effect is not sufficient, and, on the other hand, when Mg is excessively contained, not only is the effect saturated, but the material also becomes hard and brittle, which makes it difficult to manufacture materials. Therefore, in a case where Mg is incorporated into the core material, the Mg content is set to be in the above-described range. For the same reason, it is desirable to set the lower limit and upper limit of the Mg content to 0.05% and 1.0%, respectively. Even in a case where Mg is not actively incorporated, the core material may contain, for example. 0.01% or less of Mg as an inevitable impurity.

Mn: 0.1 to 2.5%

Mn is precipitated as an intermetallic compound to improve the material strength. Furthermore, Mn provides a noble potential to the material by forming a solid solution and improves the corrosion resistance. However, when the content is too small, the effect is not sufficient, and on the other hand, when Mn is excessively contained, the material becomes hard, and the material rollability deteriorates. Therefore, in a case where Mn is incorporated into the core material, the Mn content is set to be in the above-described range. For the same reason, it is desirable to set the lower limit and upper limit of the Mn content to 0.3% and 1.8%, respectively. Even in a case where Mn is not actively incorporated, the core material may contain, for example, 0.1% or less of Mn as an inevitable impurity.

Cu: 0.01 to 2.5%

Cu forms a solid solution to improve the material strength. However, when the content is loo small, the effect is not sufficient, and. on the other hand, when Cu is excessively contained, the solidus temperature of the core material decreases, and the core material melts during brazing. Therefore, in a case where Cu is incorporated into the core material, the Cu content is set to be in the above-described range. For the same reason, it is desirable to set the lower limit and upper limit of the Cu content to 0.02% and 1.2%. respectively. Even in a case where Cu is not actively incorporated, the core material may contain, for example, 0.01%, or less of Cu as an inevitable impurity.

Fe: 0.05 to 1.5%

Fe is precipitated as an intermetallic compound to improve the material strength. However, when the content is less than the lower limit, the effect is not sufficient, and on the other hand, when the content is excessive, the corrosion ratio after brazing becomes fast. Therefore, in a case where Fe is incorporated into the core material, the Fe content is set to be in the above-described range.

For the same reason, it is desirable to set the lower limit and upper limit of the Fe content to 0.1% and 0.6%. respectively. Even in a case where Fe is not actively incorporated, the core material may contain, for example, 0.05% or less of Fe as an inevitable impurity.

Zr: 0.01 to 0.3%

Zr forms a fine intermetallic compound to improve the material strength. However, when the content is less than the lower limit, the effect is not sufficient, and on the other hand, when the content is excessive, the material becomes hard, and the workability deteriorates. Therefore, in a case where Zr is incorporated into the core material, the Zr content is set to be in the above-described range. For the same reason, it is desirable to set the lower limit and upper limit of the Zr content to 0.05% and 0.2%, respectively. Even in a case where Zr is not actively incorporated, the core material may contain, for example, 0.01% or less of Zr as an inevitable impurity.

Ti: 0.01 to 0.3%

Ti forms a fine intermetallic compound to improve the material strength. However, when the content is less than the lower limit, the effect is not sufficient, and on the other hand, when the content is excessive, the material becomes hard, and the workability deteriorates. Therefore, in a case where Ti is incorporated into the core material, the Ti content is set to be in the above-described range. For the same reason, it is desirable to set the lower limit and upper limit of the Ti content to 0.0.5% and 0.2%, respectively. Even in a case when Ti is not actively incorporated, the core material may contain, for example, 0.01% or less of Ti as an inevitable impurity.

Cr: 0.01 to 0.5%

Or forms a fine intermetallic compound to improve the material strength. However, when the content is less than the lower limit, the effect is not sufficient, and on the other hand, when the content is excessive, the material becomes hard, and the workability deteriorates. Therefore, in a case when Cr is incorporated into the core material, the Cr content is set to be in the above-described range. For the same reason, it is desirable to set the lower limit and upper limit of the Cr content to 0.05% and 0.3%, respectively. Even in a case where Cr is not actively incorporated, the core material may contain, for example, 0.01% or less of Cr as an inevitable impurity.

Bi: 0.005 to 1.5%

Some of Bi diffuses into a brazing material layer and thereby decreases the surface tension of molten brazing filler metal. In addition. Bi suppresses the growth of a dense oxide film on the surface of the material. However, when the content is less than the lower limit, the effect is not sufficient, and. on the other hand, when the content is excessive, the effect is saturated, an oxide of Bi is likely to be generated on the surface of the material, and joining is impaired. Therefore, in a case where Bi is incorporated into the core material, the Bi content is set to be in the above-described range. For the same reason, it is desirable to set the lower limit and upper limit of the Bi content to 0.05% and 0.5%, respectively. Even in a case where Bi is not actively incorporated, the core material may contain, for example, 0.005% or less of Bi as an inevitable impurity.

Zn: 0.1 to 9.0%

Zn makes the pitting potential of the material more base than other members and exhibits a sacrificial protection effect. However, when the content is less than the lower limit, the effect is not sufficient, and. on the other hand, when the content is excessive, the effect is saturated. Therefore, in a case where Zn is incorporated into the core material, the Zn content is set to be in the above-described range. For the same reason, it is desirable to set the lower limit and upper limit of the Zn content to 0.5% and 7.0%. respectively. Even in a case where Zn is not actively incorporated, the core material may contain, for example, 0.1% or less of Zn as an inevitable impurity.

"Sacrificial Material"

In the present aspect, the core material can be clad with a sacrificial material in the aluminum brazing sheet.

The composition of the sacrificial material in the present aspect is not limited to a specific composition, and the following components are suitably shown.

Zn: 0.1 to 9.0%

Zn makes the natural potential of the material more base than other members and is added to the sacrificial material to improve the pitting resistance of a clad material by making a sacrificial protection effect exhibited. When the content is less than the lower limit, the effect is not sufficient, and, when the content exceeds the upper limit, the potential becomes too base, the corrosion consumption rate of the sacrificial material becomes fast, and the pitting resistance of the clad material deteriorates due to the premature loss of the sacrificial material. For the same reason, it is desirable to set the lower limit and upper limit of the amount of Zn that is contained in the sacrificial material to 1.0% and 8.0%, respectively.

Si: 0.05 to 1.2%

Si is precipitated as an intermetallic compound such as Al—Mn—Si or Al—Mn—Si—Fe to disperse starting points of corrosion and thereby improve the pitting resistance of the clad material and is thus added to the sacrificial material as desired. When the content is less than the lower limit, the effect is not sufficient, and, when the content exceeds the upper limit, the corrosion rate becomes fast, and the pitting resistance of the clad material deteriorates due to the premature loss of the sacrificial material. For the same reason, it is desirable to set the lower limit and upper limit of the amount of Si that is contained in the sacrificial material to 0.3% and 1.0%, respectively.

Mg: 0.01 to 2.0%

Mg improves the corrosion resistance by making oxide film strong and is thus added to the sacrificial material as desired. When the content is less than the lower limit, the effect is not sufficient, and, on the other hand, when the content exceeds the upper limit, the material becomes too hard, and the rolling manufacturability deteriorates. For the same reason, it is desirable to set the lower limit and upper limit of the amount of Mg that is contained in the sacrificial material to 0.05% and 1.5%, respectively.

Mn: 0.1 to 2.5%

Mn is precipitated as an intermetallic compound such as Al—Mn, Al—Mn—Si, Al—Mn—Fe or Al—Mn—Si—Fe to disperse starting points of corrosion and thereby improve the pitting resistance of the clad material and is thus added to the sacrificial material as desired. When the content is less than the lower limit, the effect is not sufficient, and when the content exceeds the upper limit, the corrosion rate becomes fast, and the pitting resistance of the clad material deteriorates due to the premature loss of the sacrificial material. For the same reason, it is desirable to set the lower limit and upper limit of the amount of Mn that is contained in the sacrificial material to 0.4% and 1.8%, respectively.

Fe: 0.05 to 1.5%

Fe is precipitated as an intermetallic compound such as Al—Mn—Fe or Al—Mn—Si—Fe to disperse starting points of corrosion and thereby improve the pitting resistance of the clad material and is thus added to the sacrificial material as desired. When the content is less than the lower limit, the effect is not sufficient, and, when the content exceeds the upper limit, the corrosion rate becomes fast, and the pitting resistance of the clad material deteriorates due to the premature loss of the sacrificial material. For the same reason, it is desirable to set the lower limit and upper limit of the amount of Fe that is contained in the sacrificial material to 0.1% and 0.7%, respectively.

Zr: 0.01 to 0.3%

Zr is precipitated as an Al—Zr intermetallic compound to disperse stalling points of corrosion or forms the dense and loose portions of a Zr solid solution to make corrosion progress in a lamellar shape and thereby improve the pitting resistance of the clad material and is thus added to the sacrificial material as desired. When the content is less than the lower limit, the effect is not sufficient, and. on the other hand, when the content exceeds the upper limit, a large intermetallic compound is formed during casting, and the reliability deteriorates. For the same reason, it is desirable to set the lower limit and upper limit of the amount of Zr that is contained in the sacrificial material to 0.05% and 0.25%, respectively.

Ti: 0.01 to 0.3%

Ti is precipitated as an Al—Ti intermetallic compound to disperse starting points of corrosion or forms the dense and loose portions of a Ti solid solution to make corrosion progress in a lamellar shape and thereby improve the pitting resistance of the clad material and is thus added to the sacrificial material as desired. When the content is less than the lower limit, the effect is not sufficient, and, on the other hand, when the content exceeds the upper limit, a large intermetallic compound is formed during casting, and the reliability deteriorates. For the same reason, it is desirable to set the lower limit and upper limit of the amount of Ti that is contained in the sacrificial material to 0.05% and 0.25%, respectively.

Cr: 0.01 to 0.5%

Cr is precipitated as an Al—Cr intermetallic compound to disperse starting points of corrosion or forms the dense and loose portions of a Cr solid solution to make corrosion progress in a lamellar shape and thereby improve the pitting resistance of the clad material and is thus added to the sacrificial material as desired. When the content is less than the lower limit, the effect is not sufficient, and, on the other hand, when the content exceeds the upper limit, a large intermetallic compound is formed during casting, and the reliability deteriorates. For the same reason, it is desirable to set the lower limit and upper limit of the amount of Cr that is contained in the sacrificial material to 0.1% and 0.4%, respectively.

Bi: 0.005 to 1.5%

Bi diffuses into molten brazing filler metal when the molten brazing filler metal has come into contact with the surface of the sacrificial material and thereby decreases the surface tension of the molten brazing filler metal and suppresses the growth of a dense oxide film on the surface of the material and is thus added to the sacrificial material as desired. However, when the content is less than the lower limit, the effect is not sufficient, and, on the other hand, when the content is excessive, the effect is saturated, an oxide of Bi is likely to be generated on the surface of the material, and joining is impaired. Therefore, the content of Bi that is contained in the sacrificial material is set to be in the above-described range. For the same reason, it is desirable to set the lower limit and upper limit of the Bi content to 0.05% and 0.5%, respectively. However, even in a case where Bi is not actively added, the sacrificial material may contain, for example, 0.005% or less of Bi as an inevitable impurity.

"Method for Manufacturing Brazing Material Before Cladding"

A desirable brazing material composition of the present embodiment is prepared to smelt an aluminum alloy. The smelting can be performed by a semi-continuous casting method. A homogenization treatment is performed on the obtained aluminum alloy ingot as necessary under predetermined conditions. The homogenization treatment is desirably performed at a homogenization treatment temperature of 440° C. or lower.

Hot rolling and cold rolling are performed on the aluminum alloy ingot, whereby a sheet-like brazing material can be obtained.

It is desirable to face the surface of the aluminum alloy ingot for the brazing material. For example, Ra is made to be 2.0 μm or less. When Ra is more than 2.0 μm, it is considered that MgO is likely to be generated and MgO is likely to crystallize.

It is considered that the temperature and time of the hot rolling affect the crystallization of MgO, and, in a case where the hot rolling is performed at higher than 440° C., MgO is likely to crystallize, and thus the time of the hot rolling at higher than 440° C. is desirably set to five minutes or shorter.

"Hot Rolling of Clad Material"

Next, the brazing material is assembled with the core material and the like and hot-clad rolled; however, at this time, in the present embodiment, it is desirable to appropriately control the soaking treatment temperature, the hot rolling time, the annealing temperature and the $O_2$ concentration during annealing.

In addition, in the case of performing a soaking treatment during cladding, the soaking treatment is desirably performed in a temperature range of 400° C. or higher and 520° C. or lower. When the soaking temperature exceeds 520° C., it is considered that MgO is likely to be generated.

Specifically, conditions where the rolling time at higher than 440° C. during the hot rolling is set to five minutes or shorter are desirable. When the rolling time at higher than 440° C. exceeds five minutes, it is considered that MgO is likely to crystallize.

In addition, the annealing temperature is desirably set to 400° C. or lower. When the annealing temperature exceeds 400° C., MgO is likely to crystallize. In addition, the oxygen concentration in the annealing atmosphere is desirably set to 0.2% or less. In a case where the oxygen concentration ($O_2$ concentration) is high, it is considered that MgO is likely to be generated and MgO is likely to crystallize.

After that, cold rolling or the like is performed, and the brazing sheet of the present aspect is obtained.

In the cold rolling, it is possible to perform cold rolling at a total reduction rate of, for example, 75% or larger, perform process annealing at a temperature of 300 to 400° C. and then perform final rolling at a reduction rate of 40%. Cold rolling conditions are not particularly limited, and, as an example, the above-described conditions can be adopted. In addition, the process annealing may not be performed. In addition, it is also possible to adopt a step of performing final annealing after the cold rolling.

In order to obtain the materials of the present aspect, it is desirable to appropriately combine facing conditions after casting, the homogenization conditions, the hot rolling conditions and the annealing conditions.

It is possible to obtain a clad material joined by overlaying the brazing material on one or both sides of the core material by performing hot rolling and cold rolling.

Figure 1:
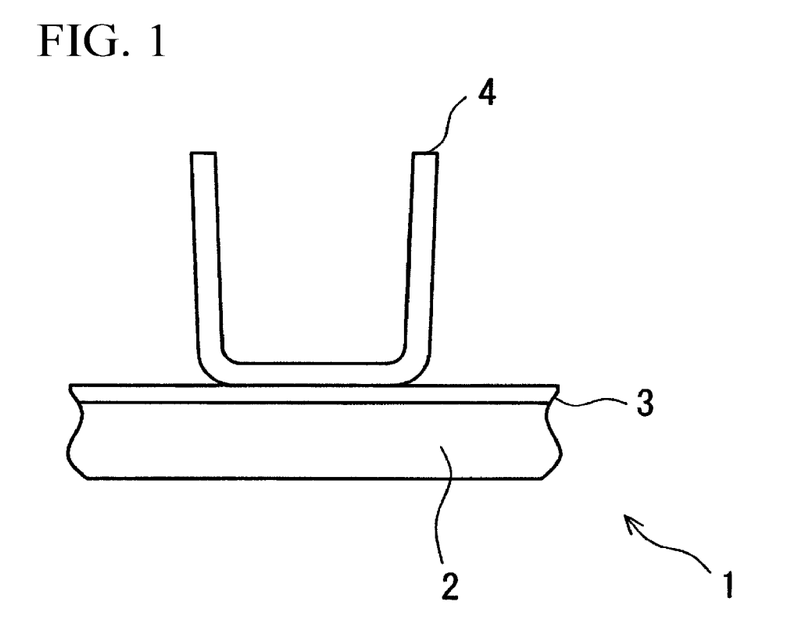
FIG. 1 is a view showing a brazing sheet for flux-free brazing in one embodiment of the present invention.

The above-described steps make it possible to obtain an aluminum brazing sheet for brazing 1 in which one side of an aluminum alloy core material 2 is clad with an aluminum alloy brazing material 3 as shown in FIG. 1. FIG. 1 shows the aluminum brazing sheet 1 in which one side of the core material is clad with the brazing material, but both sides of the core material may be clad with the brazing material in the aluminum brazing sheet. In addition, one side of the core material may be clad with the brazing material and the other side of the core material may be clad with the sacrificial material or the like in the aluminum brazing sheet.

As a member to be brazed 4, an aluminum alloy having a composition or the like containing, for example, in mass %, 0.1 to 0.8% of Mg and 0.1 to 1.2% of Si with a balance consisting of Al and an inevitable impurity is prepared and worked into an appropriate shape of a fin material or the like. As the present aspect, the composition of the member to be brazed is not particularly limited.

In the case of having obtained a fin material for a heat exchanger by the above-described cold rolling or the like, subsequently, corrugating or the like is performed as necessary. The corrugating can be performed by passing the fin material between two rotating molds, enables working to be favorably performed and exhibits excellent formability.

The fin material obtained in the above-described step is subjected to brazing as an assembled body in which the fin material is combined as a configuration member of a heal exchanger with other configuration members (a tube, a header or the like).

The assembled body is disposed in a healing furnace where a non-oxidizing atmosphere is formed under normal pressure. The non-oxidizing atmosphere can be formed using an inert gas such as a nitrogen gas or argon, a reducing gas such as hydrogen or ammonia or a gas mixture thereof. The pressure of the atmosphere in a brazing furnace is basically set to normal pressure. In addition, the atmosphere in the brazing furnace may he set to a medium-low vacuum of approximately 100 kPa to 0.1 Pa in a temperature range before the melting of the brazing material in order to, for example, improve the gas substitution efficiency in products or may be set to a pressure approximately 5 to 10 Pa higher than the atmospheric pressure in order to suppress the incorporation of an external air (atmospheric air) into the furnace. These pressure ranges are included in a range where "decompression is not accompanied" in the present aspect.

The heating furnace does not need to have a sealed space and may be a tunnel-type heating furnace having a carrying-in port and a carrying-out port of the brazing material. Even in such a heating furnace, the non-oxidizing atmosphere is maintained by continuously blowing an inert gas into the furnace. In the non-oxidizing atmosphere, the oxygen concentration is desirably 50 ppm or lower in terms of volume ratio.

In the non-oxidizing atmosphere, joining by brazing is performed under a heat treatment condition where the attainment temperature of the assembled body reaches 559 to 630° C. by, for example, heating the assembled body at a temperature rise rate of 10 to 200° C./min.

In the brazing conditions, as the temperature rise rate becomes faster, the brazing time becomes shorter, and thus the growth of an oxide film on the surface of the material is suppressed and the brazability improves. When the attainment temperature is set to at least the solidus temperature of the brazing material or higher, blazing is possible: however, as the attainment temperature comes closer to the liquidus temperature, a fluid brazing material increases, and it becomes easy to obtain a favorable joining slate at joints having an opening portion. However, when the attainment temperature is set to a too high temperature, erosion of the brazing filler metal is likely to progress, and the structure dimension accuracy of the assembled body after brazing decreases, which is not preferable.

At this time, the eutectic temperature of the Al—Si—Mg system is approximately 560 to 570° C. and a eutectic portion melts under the brazing conditions. It is preferable that the proportion of MgO in an oxide film occurring on the surface of the brazing material (Al—Si—Mg—X brazing material) is 2% or less and the proportion of a region with crystallinity among the MgO in the oxide film is 4% or less.

Figure 2:
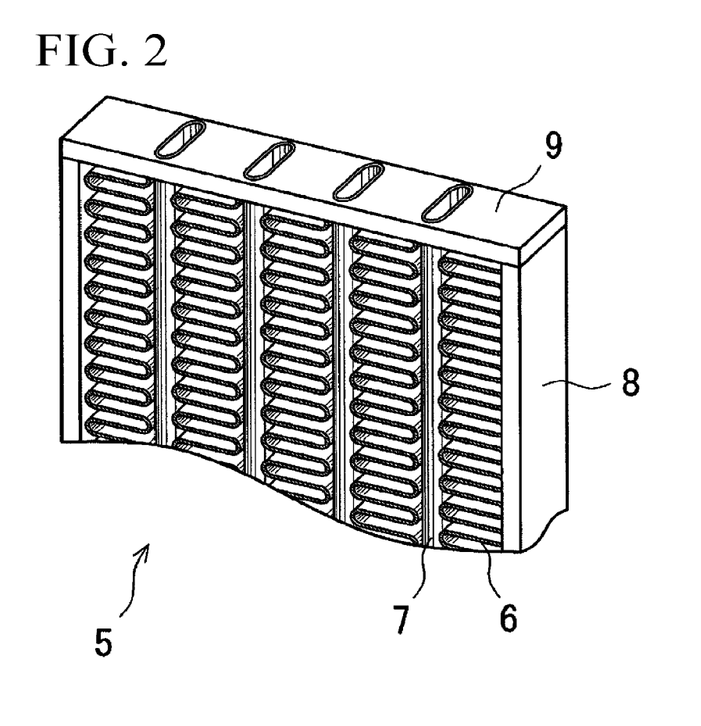
FIG. 2 is a perspective view showing an aluminum car heat exchanger in one embodiment of the present invention.

FIG. 2 shows an aluminum heat exchanger 5 for which fins 6 are formed using the aluminum brazing sheet 1 and aluminum alloy tubes 7 are used as a material to be brazed. The fins 6 and the tubes 7 are combined with a reinforcing material 8 and a header plate 9 and joined by flux-free brazing, whereby the aluminum heat exchanger 5 for cars or the like can be obtained.

Figure 3:
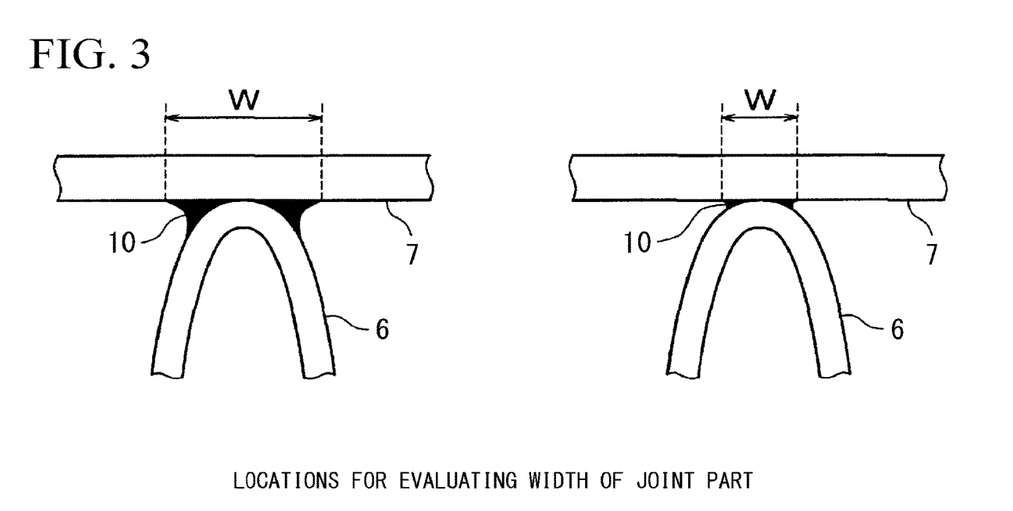
FIG. 3 is a view showing a brazing model in one example of the present invention.

FIG. 3 shows the width W of a joining portion 10 composed of fillets formed between the curved portion of the fin 6 and the lube 7 (the total width of the fillets occurring along the length direction of the tube 7 so as to sandwich the contact portion between the apex of the curved portion of the fin 6 and the tube 7).

FIG. 3 shows an example where the width W of the joining portion 10 is formed to be large and an example where the width is formed to be small in contrast laterally.

As shown in FIG. 3, when the width W of the joining portion 10 is large, favorable joining by brazing has been achieved.

In the heat exchanger 5 manufactured by performing joining by brazing using the fins 6 made of the brazing sheet 1 according to the present embodiment, since sufficiently large fillets can be formed in the joining portions by brazing, it is possible to provide the heat exchanger 5 having favorable joining portions by brazing.

EXAMPLES

A variety of brazing sheets for which an Al alloy brazing material having a composition shown in Table 1 and Table 2 (balance: Al and an inevitable impurity) was used were produced from hot-rolled sheets obtained under casting conditions and hot rolling conditions shown in Table 3. A core material is an aluminum alloy sheet having a composition of Al-1.0Mn-0.2Si-0.15Cu-0.3Mg in all specimens. The clad ratio is 10% of the brazing material with respect to the core material.

After that, 0.20 mm-thick cold-rolled sheets that had been refined to H14 were produced by cold rolling including process annealing.

In addition, as members to be brazed, corrugated fins of an A3003 alloy and an H14 aluminum bare material (0.06 mm in thickness) were used.

Tubes having a width of 25 mm were produced using the aluminum clad material, and the tube and the corrugated fin were combined such that the tube brazing material and the corrugated fin came into contact with each other to produce a 300 mm-long evaluation core including 15 levels of the tube as a brazing evaluation model.

The evaluation core was heated up to 600° C. and brazed in a brazing furnace in a nitrogen atmosphere (oxygen content: 15 ppm), thereby evaluating the brazing state of the evaluation core. In the temperature rise and the cooling at that time, the average temperature rise rate up to 600° C. from room temperature is 30° C./min, and the cooling rate after the end of the brazing is 100° C./min.

The brazing conditions are not limited to what has been described above. Hereinafter, each evaluation item will be described.

"Measurement of Area Ratio of MgO in Oxide Film"

The area ratio of MgO in an oxide film is measured using TEM-ASTAR (transmission electron microscope-based crystal orientation analysis system) and EDS (Energy-dispersive X-ray spectrometer) after arbitrarily-selected 10 sites are cut out from the evaluation core before brazing and each cross section is FIB-processed (Focused ion beam-processed).

The area of the oxide film is calculated from the bright field image observation with TEM and EDS analysis (Energy-dispersive X-ray spectroscopy). Furthermore, a region obtained by subtracting an $Al_2O_3$ film region and a $MgAlO_4$ film region from the area of the oxide film is determined as a MgO region (including an unanalyzable region), and the proportion (area ratio: %) of MgO in the oxide film is calculated. The area ratio of MgO in the oxide film is the average value of 10 measurement sites.

"Measurement of Region with Crystallinity Among MgO"

The measurement of the region with crystallinity among MgO is measured using TEM-ASTAR and EDS after arbitrarily-selected 10 sites are cut out from the evaluation core before brazing and each cross section is FIB-processed.

The area of the oxide film is calculated from the bright field image observation with TEM and EDS analysis. Furthermore, a region obtained by subtracting an $Al_2O_3$ film region and a $MgAlO_4$ film region from the area of the oxide film is determined as a MgO region (including an unanalyzable region). Furthermore, a region in the MgO region from which an electron beam diffraction pattern can be obtained is determined as crystalline MgO, and the region with crystallinity among MgO (area ratio) is calculated.

"Evaluation of Brazability"

"Joining Rate"

The joining rate (fin joining rate) according to the following formula was obtained, and superiority or inferiority was evaluated between individual cores for brazing evaluation.

Fin joining rate=(total brazing length between fins and tubes/total contact length between fins and tubes)×100 (%)

A fin joining rate of 95% or more was evaluated as o, and a fin joining rate of less than 95% was evaluated as x.

The total content length between the fins and the tubes means the total of the contact lengths between the fins and the tubes at a point in time when the fins and the tubes were assembled in the evaluation core assembled as described above.

The total brazing length means the total length of sites where the fins and the tubes were actually joined by brazing after brazing. The identification of sites of joining by brazing and the identification of sites of non-joining were distinguished by tearing the fins from the tubes after brazing and visually determining brazed sites and non-brazed sites. The non-brazed site is a portion where molten brazing filler metal does not flow around and comes in and thus can be easily differentiated visually.

In a case where the fin joining rate is 100%, the total contact length becomes equal to the total brazing length, and, in a case where the joining property by brazing is poor, the total contact length becomes larger than the total brazing length (there is a region where the fin and the tube are in contact with each other but are not joined to each other).

"Fillet Length"

A brazed core sample is embedded in a resin and mirror-polished, the fillet lengths in the joining portion shown in FIG. 3 are measured using an optical microscope, and superiority or inferiority is evaluated.

A fillet length of 700 μm or more was evaluated as oo, a fillet length of 600 μm or more and less than 700 μm was evaluated as o, and a fillet length of less than 600 μm was evaluated as x.

The above evaluation results are shown in Table 1 and Table 2 below.

TABLE 1

| | Test piece No. | Brazing material composition [mass %] | | | | | | | Manufacturing method | State of oxide film | | Brazability | |
| | | Mg | Si | Bi | Ga | Sn | In | Pb | | Proportion of MgO (area ratio: %) | Proportion of crystalline MgO (area ratio: %) | Joining rate | Fillet length |
|---|---|---|---|---|---|---|---|---|---|---|---|---|---|
| Example | 1 | 0.05 | 10 | 0.1 | 0 | 0 | 0 | 0 | B | 1.2 | 4.0 | o | o |
| | 2 | 0.1 | 10 | 0.1 | 0 | 0 | 0 | 0 | A | 1.3 | 3.5 | oo | o |
| | 3 | 0.2 | 10 | 0.1 | 0 | 0 | 0 | 0 | B | 1.5 | 2.9 | oo | oo |
| | 4 | 0.8 | 10 | 0.1 | 0 | 0 | 0 | 0 | C | 1.7 | 2.8 | oo | oo |
| | 5 | 1.5 | 10 | 0.1 | 0 | 0 | 0 | 0 | C | 1.8 | 3.0 | oo | oo |
| | 6 | 2.0 | 10 | 0.1 | 0 | 0 | 0 | 0 | C | 2.0 | 4.0 | o | o |
| | 7 | 0.3 | 2 | 0.1 | 0 | 0 | 0 | 0 | A | 1.5 | 2.5 | o | o |
| | 8 | 0.3 | 3 | 0.1 | 0 | 0 | 0 | 0 | A | 1.5 | 2.8 | oo | o |
| | 9 | 0.3 | 10 | 0.1 | 0 | 0 | 0 | 0 | A | 1.5 | 2.0 | oo | oo |
| | 10 | 0.3 | 12.5 | 0.1 | 0 | 0 | 0 | 0 | A | 1.5 | 2.5 | oo | oo |

TABLE 1-continued

| | Brazing material composition [mass %] | | | | | | | Manufacturing | State of oxide film | | Brazability | |
|---|---|---|---|---|---|---|---|---|---|---|---|---|
| | | | | | | | | | Proportion of MgO | Proportion of crystalline MgO | Joining | Fillet |
| Test piece No. | Mg | Si | Bi | Ga | Sn | In | Pb | method | (area ratio: %) | (area ratio: %) | rate | length |
| 11 | 0.3 | 14 | 0.1 | 0 | 0 | 0 | 0 | A | 1.5 | 2.0 | ○○ | ○ |
| 12 | 0.3 | 10 | 0.01 | 0 | 0 | 0 | 0 | B | 0.9 | 2.5 | ○ | ○ |
| 13 | 0.3 | 10 | 0.03 | 0 | 0 | 0 | 0 | A | 1.0 | 2.5 | ○○ | ○○ |
| 14 | 0.3 | 10 | 0.22 | 0 | 0 | 0 | 0 | A | 1.4 | 2.9 | ○○ | ○○ |
| 15 | 0.3 | 10 | 0.3 | 0 | 0 | 0 | 0 | A | 2.0 | 3.0 | ○○ | ○○ |
| 16 | 0.3 | 10 | 0 | 0.1 | 0 | 0 | 0 | C | 1.5 | 2.6 | ○○ | ○○ |
| 17 | 0.3 | 10 | 0 | 0 | 0.1 | 0 | 0 | A | 1.8 | 3.0 | ○○ | ○○ |
| 18 | 0.3 | 10 | 0 | 0 | 0 | 0.1 | 0 | A | 1.9 | 2.8 | ○○ | ○○ |
| 19 | 0.3 | 10 | 0 | 0 | 0 | 0 | 0.1 | C | 1.8 | 2.6 | ○○ | ○○ |
| 20 | 0.3 | 10 | 0.05 | 0.05 | 0.05 | 0.05 | 0.05 | A | 1.5 | 3.0 | ○○ | ○○ |
| 21 | 0.3 | 10 | 0.1 | 0.1 | 0.1 | 0.1 | 0.1 | A | 1.6 | 3.2 | ○○ | ○○ |
| 22 | 0.3 | 10 | 0.1 | 0 | 0 | 0 | 0 | A | 1.5 | 2.8 | ○○ | ○○ |
| 23 | 0.3 | 10 | 0.1 | 0 | 0 | 0 | 0 | B | 1.4 | 2.5 | ○○ | ○○ |
| 24 | 0.3 | 10 | 0.1 | 0 | 0 | 0 | 0 | C | 1.2 | 2.3 | ○○ | ○○ |
| 25 | 1.0 | 10 | 0.15 | 0 | 0 | 0 | 0 | A | 1.7 | 3.2 | ○○ | ○○ |
| 26 | 1.0 | 10 | 0.15 | 0 | 0 | 0 | 0 | B | 1.6 | 2.9 | ○○ | ○○ |
| 27 | 1.0 | 10 | 0.15 | 0 | 0 | 0 | 0 | C | 1.4 | 2.7 | ○○ | ○○ |

TABLE 2

| | | Brazing material composition [mass %] | | | | | | | Manufacturing | State of oxide film | | Brazability | |
|---|---|---|---|---|---|---|---|---|---|---|---|---|---|
| | | | | | | | | | | Proportion of MgO | Proportion of crystalline MgO | Joining | Fillet |
| Test piece No. | | Mg | Si | Bi | Ga | Sn | In | Pb | method | (area ratio: %) | (area ratio: %) | rate | length |
| Comparative Example | 1 | 0.02 | 10 | 0.1 | 0 | 0 | 0 | 0 | A | 1.0 | 7.0 | × | × |
| | 2 | 2.5 | 10 | 0.1 | 0 | 0 | 0 | 0 | B | 3.0 | 3.5 | × | × |
| | 3 | 0.3 | 1.8 | 0.1 | 0 | 0 | 0 | 0 | C | 1.5 | 3.0 | × | × |
| | 4 | 0.3 | 15 | 0.1 | 0 | 0 | 0 | 0 | A | 1.5 | 3.0 | — | — |
| | 5 | 0.3 | 10 | 0.005 | 0 | 0 | 0 | 0 | A | 0.8 | 2.0 | × | × |
| | 6 | 0.3 | 10 | 0.4 | 0 | 0 | 0 | 0 | C | 2.8 | 2.0 | ○ | × |
| | 7 | 0.3 | 10 | 0.3 | 0.1 | 0.1 | 0.1 | 0.1 | A | 3.0 | 3.4 | × | × |
| | 8 | 0.3 | 10 | 0.1 | 0 | 0 | 0 | 0 | D | 0.5 | 5.1 | ○ | × |
| | 9 | 0.3 | 10 | 0.1 | 0 | 0 | 0 | 0 | E | 2.3 | 4.6 | ○ | × |
| | 10 | 0.3 | 10 | 0.1 | 0 | 0 | 0 | 0 | F | 2.2 | 4.6 | ○ | × |
| | 11 | 0.3 | 10 | 0.1 | 0 | 0 | 0 | 0 | G | 2.2 | 4.7 | ○ | × |
| | 12 | 0.3 | 10 | 0.1 | 0 | 0 | 0 | 0 | H | 2.7 | 4.8 | ○ | × |
| | 13 | 0.3 | 10 | 0.1 | 0 | 0 | 0 | 0 | I | 3.5 | 5.8 | ○ | × |
| | 14 | 1.0 | 10 | 0.15 | 0 | 0 | 0 | 0 | D | 0.7 | 5.5 | ○ | × |
| | 15 | 1.0 | 10 | 0.15 | 0 | 0 | 0 | 0 | E | 2.5 | 5.0 | ○ | × |
| | 16 | 1.0 | 10 | 0.15 | 0 | 0 | 0 | 0 | F | 2.4 | 5.0 | ○ | × |
| | 17 | 1.0 | 10 | 0.15 | 0 | 0 | 0 | 0 | G | 2.4 | 5.1 | ○ | × |
| | 18 | 1.0 | 10 | 0.15 | 0 | 0 | 0 | 0 | H | 2.9 | 5.2 | ○ | × |
| | 19 | 1.0 | 10 | 0.15 | 0 | 0 | 0 | 0 | I | 3.7 | 6.2 | ○ | × |

TABLE 3

| | | Brazing material | | | Clad | | | |
|---|---|---|---|---|---|---|---|---|
| Manufacturing conditions | | Facing (Ra) (μm) | Homogenization treatment temperature (° C.) | Hot rolling time (min.) | Soaking treatment temperature (° C.) | Hot rolling time (min.) | Annealing temperature (° C.) | $O_2$ concentration during annealing (%) |
| Condition 1 | A | 1.5 | 430 | 4.5 | 470 | 3.0 | 360 | 0.08 |
| | B | 1.3 | 420 | 4.0 | 490 | 3.2 | 300 | 0.1 |
| | C | 0.8 | N/A | 3.5 | 490 | 4.1 | 250 | 0.15 |
| Condition 2 | D | 3.0 | 430 | 4.0 | 500 | 3.2 | 400 | 0.17 |
| | E | 1.0 | 500 | 4.2 | 450 | 4.0 | 370 | 0.1 |
| | F | 1.2 | 430 | 8.0 | 490 | 4.0 | 350 | 0.1 |

TABLE 3-continued

| Manufacturing conditions | Brazing material | | | Clad | | | |
|---|---|---|---|---|---|---|---|
| | Facing (Ra) (μm) | Homogenization treatment temperature (° C.) | Hot rolling time (min.) | Soaking treatment temperature (° C.) | Hot rolling time (min.) | Annealing temperature (° C.) | O₂ concentration during annealing (%) |
| G | 1.2 | 430 | 4.4 | 490 | 7.0 | 300 | 0.1 |
| H | 1.2 | 420 | 4.5 | 480 | 3.0 | 300 | 0.3 |
| I | 2.2 | 500 | 6.0 | 550 | 7.3 | 330 | 0.1 |

As shown by the results in Table 1, Examples No. 1 to 26 are brazing sheets, in which an Al—Si—Mg—X brazing material containing, in mass %, 0.05 to 2.0% of Mg and 2.0 to 14.0% of Si and further containing one or more of 0.01 to 0.30% of Bi, Ga, Sn, In and Pb, the total amount of Bi, Ga, Sn, In and Pb being 0.5% or less, clads one or both sides of a core material and is positioned on the outermost surface, the area ratio of MgO in the surface of an oxide film generated on the surface of the Al—Si—Mg—X brazing material is 2% or less, and the area ratio of a region with crystallinity among MgO in the surface of the oxide film is 4% or less.

Therefore, in the case of performing brazing using the above-described brazing sheet, erosion is not easily caused, and it is possible to obtain joined products by brazing, such as heat exchangers, having an excellent brazing joining property.

In addition, methods for producing the specimens of Examples Nos. 1 to 26 shown in Table 1 are in accordance with any method of A, B and C (condition 1) shown in Table 3.

In contrast to the specimens of the examples, the specimen of Comparative Example 1 shown in Table 2 is a specimen where the Mg content of the brazing material is small, the specimen of Comparative Example 2 is a specimen where the Mg content of the brazing material is large, but the proportion of crystalline MgO or the proportion of MgO becomes large, the joining rate by brazing is poor and the fillet length is not sufficient.

The specimen of Comparative Example 3 is a specimen where the Si content of the brazing material is small, but the joining rate by brazing is poor and the fillet length is not sufficient.

The specimen of Comparative Example 4 is a specimen where the Si content of the brazing material is large, but a large number of coarse Si particles are generated, which causes significant erosion.

The specimen of Comparative Example 5 is a specimen where the Bi content of the brazing material is small, but the joining rate by brazing is poor and the fillet length is not sufficient.

The specimen of Comparative Example 6 is a specimen where the Bi content of the brazing material is large, but the proportion of MgO is large and the fillet length is not sufficient.

The specimen of Comparative Example 7 is a specimen where the X content (total amount) of the brazing material is large, but the proportion of MgO is large, the joining rate by brazing is poor and the fillet length is not sufficient.

The component contents of Comparative Example 8 are within favorable ranges, but D shown in Table 3 is adopted as the manufacturing method, and thus the area proportion of crystalline MgO becomes large and the fillet length is not sufficient. D is a method in which a brazing sheet is manufactured by setting Ra of facing to 3.0 μm to coarsen the surface.

The component contents of Comparative Example 9 are within favorable ranges, but E shown in Table 3 is adopted as the manufacturing method, and thus the proportion of MgO and the area proportion of crystalline MgO both become large and the fillet length is short. E is a manufacturing method in which the homogenization treatment of the brazing material is performed at 500° C.

The component contents of Comparative Example 10 are within favorable ranges, but F shown in Table 3 is adopted as the manufacturing method, and thus the proportion of MgO and the area proportion of crystalline MgO both become large and the fillet length is short. F is a manufacturing method in which the hot rolling time of the brazing material is as long as eight minutes.

The component contents of Comparative Example 11 are within favorable ranges, but G shown in Table 3 is adopted as the manufacturing method, and thus the proportion of MgO and the area proportion of crystalline MgO both become large and the fillet length is short. G is a manufacturing method in which the hot rolling time during cladding is as long as seven minutes.

The component contents of Comparative Example 12 are within favorable ranges, but H shown in Table 3 is adopted as the manufacturing method, and thus the proportion of MgO and the area proportion of crystalline MgO both become large and the fillet length is short. H is a manufacturing method in which the oxygen concentration during annealing is 0.3%.

The component contents of Comparative Example 13 are within favorable ranges, but I shown in Table 3 is adopted as the manufacturing method, and thus the proportion of MgO and the area proportion of crystalline MgO both become large and the fillet length is short. In I, Ra of facing is 2.2 μm, the homogenization treatment of the brazing material is performed at 500° C., the hot rolling time of the brazing material is six minutes, the soaking treatment temperature during cladding is 550° C. and the hot rolling time during cladding is 7.3 minutes.

The component contents of Comparative Examples 14 to 19 are within favorable ranges; however, similar to Comparative Example 8 to Comparative Example 13, any of E to I shown in Table 3 is adopted as the manufacturing method, and thus the proportion of MgO and the area proportion of crystalline MgO both become large and the fillet length is short.

As shown by Comparative Examples 8 to 13 and Comparative Examples 14 to 19, it is found that, even when the component contents of the brazing material are within the above-described desirable ranges, it is important to set the facing conditions of an ingot for manufacturing the brazing material in the manufacturing steps, the homogenization treatment temperature of the brazing material, the hot rolling time of the brazing material, the soaking treatment temperature during cladding, the hot rolling time during cladding and the oxygen concentration during annealing to suitable ranges as described above.

It is found that, depending on the above-described manufacturing conditions, the state of the oxide film changes, the proportion of MgO in the oxide film changes, and the proportion of crystalline MgO among MgO changes, which affects the joining rate during brazing and affects the lengths of fillets that are generated during brazing.

INDUSTRIAL APPLICABILITY

The aluminum brazing sheet of the present invention can be widely used for brazing of heal exchangers such as indoor units and outdoor units of air conditioners, car heat exchangers and the like.

REFERENCE SIGNS LIST

1 Aluminum brazing sheet
2 Aluminum alloy core material
3 Aluminum alloy brazing material
4 Member to be brazed
5 Aluminum heat exchanger
6 Fin
7 Tube
10 Joining portion

The invention claimed is:

1. An aluminum brazing sheet for flux-free brazing, the aluminum brazing sheet having a multilayer structure of two or more layers including at least one core material layer and one brazing material layer, wherein
the brazing material layer is positioned on one or both sides of the core material layer and on an outermost surface of the brazing sheet,
the brazing material layer is made of an Al-Si-Mg-X brazing material containing: in mass %, 0.05 to 2.0% of Mg, and 2.0 to 14.0% of Si, and further containing one or more of 0.01 to 0.3% of Bi, Ga, Sn, In and Pb, a total amount of Bi, Ga, Sn, In and Pb being 0.5% or less,
an area ratio of MgO in an oxide film on a surface of the Al-Si-Mg-X brazing material is 2% or less, and an area ratio of a region with crystallinity among the MgO in the oxide film is 4% or less, here, the X indicates one or more of Bi, Ga, Sn, In and Pb.

2. The aluminum brazing sheet for flux-free brazing according to claim 1, wherein the brazing material contains, in mass %, 0.1 to 1.5% of Mg and 3.0 to 12.5% of Si, and further contains one or more of Bi, Ga, Sn, In and Pb in a total amount of 0.03 to 0.25%.

3. The aluminum brazing sheet for flux-free brazing according to claim 1, wherein the core material contains one or more of: in mass %, Si: 0.05 to 1.2%, Mg: 0.01 to 2.0%, Mn: 0.1 to 2.5%, Cu: 0.01 to 2.5%, Fe: 0.05 to 1.5%, Zr: 0.01 to 0.3%, Ti: 0.01 to 0.3%, Cr: 0.01 to 0.5%, Bi: 0.005 to 1.5%, and Zn: 0.1 to 9.0%.

4. The aluminum brazing sheet for flux-free brazing according to claim 1, wherein the core material contains: in mass %, Si: 0.05 to 1.2%, and Mg: 0.01 to 2.0%, and further contains one or more of: Mn: 0.1 to 2.5%, Cu: 0.01 to 2.5%, Fe: 0.05 to 1.5%, Zr: 0.01 to 0.3%, Ti: 0.01 to 0.3%, Cr: 0.01 to 0.5%, Bi: 0.005 to 1.5%, and Zn: 0.1 to 9.0%.

5. The aluminum brazing sheet for flux-free brazing according to claim 1, wherein the core material is clad with a sacrificial material, and the sacrificial material contains, in mass %, Zn: 0.1 to 9.0%, and further contains one or more of Si: 0.05 to 1.2%, Mg: 0.01 to 2.0%, Mn: 0.1 to 2.5%, Fe: 0.05 to 1.5%, Zr: 0.01 to 0.3%, Ti: 0.01 to 0.3%, Cr: 0.01 to 0.5%, and Bi: 0.005 to 1.5%.

6. The aluminum brazing sheet for flux-free brazing according to claim 1, wherein the area ratio of MgO in the oxide film on the surface of the Al-Si-Mg-X brazing material is obtained by calculating an area of an oxide film from a bright field image observed with a transmission electron microscope (TEM) and an energy-dispersive X-ray spectrometer (EDS) analysis, subtracting an $A_2O_3$ film region and a $MgAlO_4$ film region from the area of the oxide film to determine a MgO region, and calculating the area ratio of MgO in the oxide film.

7. The aluminum brazing sheet for flux-free brazing according to claim 1, wherein the region with crystallinity among MgO is obtained by calculating an area of an oxide film from a bright field image observation with a TEM and an EDS analysis, subtracting an $A_2O_3$ film region and a $MgAlO_4$ film region from the area of the oxide film to determine a MgO region, determining a region having an electron beam diffraction pattern in the MgO region as a crystalline MgO, and calculating an area ratio of crystalline MgO in the oxide film.

* * * * *